(12) United States Patent
Matsuoka et al.

(10) Patent No.: US 12,241,496 B2
(45) Date of Patent: Mar. 4, 2025

(54) MEMBER FOR FASTENING AND METHOD OF MANUFACTURING SAME

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Hideaki Matsuoka, Nagakute (JP); Gaku Kitahara, Nagakute (JP); Tatsuyuki Amago, Nagakute (JP); Hiroyuki Mori, Nagakute (JP); Jun Yaokawa, Nagakute (JP); Kyosuke Izuno, Nisshin (JP); Kohei Takahashi, Nisshin (JP); Tomohiko Sekiguchi, Nagakute (JP); Ayaka Kagami, Toyota (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 18/164,159

(22) Filed: Feb. 3, 2023

(65) Prior Publication Data
US 2023/0296125 A1 Sep. 21, 2023

(30) Foreign Application Priority Data

Mar. 18, 2022 (JP) .................................. 2022-044150

(51) Int. Cl.
*F16B 37/06* (2006.01)
*B23K 11/14* (2006.01)

(52) U.S. Cl.
CPC ............ *F16B 37/061* (2013.01); *B23K 11/14* (2013.01)

(58) Field of Classification Search
CPC ............................... F16B 37/061; B23K 11/14
(Continued)

(56) References Cited

U.S. PATENT DOCUMENTS 1,883,906 A * 10/1932 Hasselquist ............ B21K 25/00
29/512
2,112,594 A * 3/1938 Double ................. F16B 37/065
411/965
(Continued)

FOREIGN PATENT DOCUMENTS

JP S60-52410 U 4/1985
JP 2010-096351 A 4/2010
(Continued)

OTHER PUBLICATIONS

Feb. 20, 2024 Notification of Reasons for Refusal issued in Japanese Patent Application No. 2022-044150.

*Primary Examiner* — Gary W Estremsky
(74) *Attorney, Agent, or Firm* — Oliff PLC

(57) ABSTRACT

A method of manufacturing a member for fastening by joining a nut with a tubular joint portion extending from a main body formed with an internal thread to a panel with a mounting hole for the nut on an aluminum base material. The joint portion has a rotation-preventing portion with a concave and convex shaped outer peripheral surface and a guide portion extending from the rotation-preventing portion to one side. After the guide portion is inserted into the mounting hole, the nut is energized by electrodes in contact with both nut end surface sides. The nut then generates heat, and the periphery of the mounting hole is heated and softened. When the nut is pressurized with the electrodes, the rotation-preventing portion bites into the mounting hole, and the one end portion of the guide portion is swaged to become a retaining portion on one surface side of the panel.

7 Claims, 3 Drawing Sheets

(58) Field of Classification Search
USPC .......................................... 411/131, 171, 123
See application file for complete search history.

(56) References Cited

U.S. PATENT DOCUMENTS

| | | | | |
|---|---|---|---|---|
| 2,707,507 | A * | 5/1955 | Tripp | F16B 37/061 |
| | | | | 403/189 |
| 3,020,987 | A * | 2/1962 | Schaurte | F16B 37/061 |
| | | | | 228/178 |
| 3,177,916 | A * | 4/1965 | Rosan | F16B 37/068 |
| | | | | 411/968 |
| 8,221,040 | B2 | 7/2012 | Babej et al. | |
| 8,646,166 | B2 | 2/2014 | Babej et al. | |
| 10,655,666 | B2 | 5/2020 | Hoshino et al. | |
| 2006/0291974 | A1 * | 12/2006 | McGee | B25B 27/0014 |
| | | | | 411/171 |
| 2007/0212193 | A1 * | 9/2007 | Wang | F16B 37/061 |
| | | | | 411/171 |
| 2008/0003893 | A1 * | 1/2008 | Frenken | F16B 41/002 |
| | | | | 439/813 |
| 2008/0120825 | A1 * | 5/2008 | Shuart | B23P 19/062 |
| | | | | 428/221 |
| 2008/0199274 | A1 * | 8/2008 | Babej | B21K 1/702 |
| | | | | 411/171 |
| 2009/0169327 | A1 * | 7/2009 | Wu | F16B 37/061 |
| | | | | 411/106 |
| 2010/0129173 | A1 | 5/2010 | Babej et al. | |
| 2012/0216390 | A1 | 8/2012 | Babej et al. | |
| 2012/0219377 | A1 * | 8/2012 | Pamer | F16B 39/282 |
| | | | | 411/188 |
| 2013/0185921 | A1 * | 7/2013 | Diehl | B23P 19/00 |
| | | | | 29/525.11 |
| 2018/0266475 | A1 | 9/2018 | Hoshino et al. | |

FOREIGN PATENT DOCUMENTS

| | | |
|---|---|---|
| JP | 2013-113396 A | 6/2013 |
| JP | 2017-155860 A | 9/2017 |
| WO | 2006/004084 A1 | 1/2006 |

* cited by examiner

《Insertion》

《Energization/Pressurization》

《Joint》

(Before test)    Sample C2    Sample C1    Sample 1

Kalei nut      Curling nut

MEMBER FOR FASTENING AND METHOD OF MANUFACTURING SAME

TECHNICAL FIELD

The present invention relates to a member for fastening in which a nut is joined to a thin sheet-like panel and relates also to relevant techniques.

BACKGROUND ART

Housings, vehicle bodies, and other similar articles are often made of panels obtained by shape formation of thin sheet materials or the like. When a panel is prepared and another member is firmly fixed to the panel in a detachable manner, the panel is required to have a thread (e.g., an internal thread). However, even if a thin panel itself is tapped (threaded), the number of pitches required for fastening cannot be ensured. Thus, a nut is attached to the panel.

Methods of attaching a nut to a panel include, for example, a welding method and a press-fitting method. The welding method (weld-nut method) is not suitable for difficult-to-weld panels (such as Al alloy sheets) because this method is inferior in the work simplicity and environmental friendliness. The press-fitting method has few restrictions due to the material of panel and is excellent in the workability. The press-fitting method employs, for example, a scheme of pressing a clinching nut or a Kalei nut into a mounting hole of a panel. As a mechanical mounting method other than the press-fitting method, there is also a method of swaging the tip portion of a curling nut and fixing it to a panel. Descriptions related to the curling nut are found in Patent Document 1 below, and descriptions related to the clinching nut are found in Patent Document 2 below.

PRIOR ART DOCUMENTS

Patent Documents

[Patent Document 1] JP60-52410U
[Patent Document 2] JP2013-113396A

SUMMARY OF INVENTION

Technical Problem

Patent Document 1 proposes a curling nut that has a skirt for swage fixation and a serration for rotation prevention provided on a bearing surface of the nut.

Patent Document 2 proposes a press-fit nut capable of increasing the pull-out load (pressing strength) after being attached to a panel.

None of the documents makes any mention of the material of a panel to which the nut is attached. Conventional methods have targeted panels of highly ductile steel materials, etc., and have not targeted panels of aluminum base materials, which are liable to cause cracking.

The present invention has been made in view of such circumstances, and an object of the present invention is to provide a novel method and relevant techniques that allow a nut to be efficiently attached to a panel of an aluminum base material.

Solution to Problem

As a result of intensive studies to achieve the above object, the present inventors have conceived of energizing and pressurizing a nut inserted in a panel of an aluminum base material through electrodes to attach the nut to the panel and have embodied this technique. Developing this achievement, the present inventors have accomplished the present invention, which will be described hereinafter.

«Method of Manufacturing Member for Fastening»

The present invention provides a method of manufacturing a member for fastening obtained by joining a nut to a panel of an aluminum base material. The panel has a mounting hole for the nut. The nut comprises: a main body having an internal thread and a bearing surface that is wider than the mounting hole; and a tubular joint portion extending from the bearing surface side to one side in an axial direction of the internal thread. The joint portion is longer than a depth of the mounting hole. The joint portion has a rotation-preventing portion and a guide portion. The rotation-preventing portion has a concave and convex shaped outer peripheral surface. The guide portion extends from the rotation-preventing portion to the one side and has a width smaller than an maximum width of the outer peripheral surface. The method includes an energization step of energizing the nut from a pair of electrodes to soften a periphery of the mounting hole of the panel by resistance heat generation of the nut. The guide portion of the nut is inserted in the mounting hole from another surface side than one surface side of the panel. The pair of electrodes is in contact with both end surface sides of the nut. The method further includes a pressurization step of swaging one end portion of the guide portion by a pressing force applied from the electrodes to the nut to form a retaining portion and allow the rotation-preventing portion to bite into the mounting hole. The retaining portion has a widened width on the one surface side of the panel.

According to the present invention, the nut can be stably and firmly attached to the panel of an aluminum base material (simply referred to as an "Al base material"). The reason for this can be considered as follows.

First, in a state in which the guide portion of the nut is inserted in the mounting hole of the panel, the pair of electrodes in (pressure) contact with both end surfaces (sides) of the nut is energized to cause the nut to generate resistance heat (energization step). The periphery (local area) of the mounting hole of the panel of an Al base material is heated by heat transfer from the nut and softened. This allows even the panel of an Al base material with poor ductility to be easily plastically deformed, and the hole expansion resistance (property of deforming without cracking or the like) when the nut is press-fitted can be improved.

After the energization step or in parallel with the energization step (in a superimposed manner), the electrodes pressurize the nut whose joint portion is inserted in the mounting hole (pressurization step). This allows one end portion of the guide portion to be swaged and increased in the width on one surface side of the panel to form a retaining portion. Moreover, after or in parallel with the formation of the retaining portion, the rotation-preventing portion bites into the mounting hole. Even when the rotation-preventing portion bites into the panel by a large amount, the periphery of the mounting hole is softened and easily deformed, so it is difficult to crack.

The manufacturing method of the present invention is excellent in the workability because the energization step and the pressurization step can be performed continuously or substantially simultaneously using the pair of electrodes. The temperature of the nut itself increases due to the energization step, and therefore one end portion of the guide portion is more likely to deform into the retaining portion than when cold, and is less likely to crack.

Thus, the member for fastening obtained by the manufacturing method of the present invention exhibits a high pressing load due to the retaining portion and excellent co-rotation resistance (resistance to co-rotating with each other) due to the rotation-preventing portion and achieves a state in which the nut is firmly joined to the panel. Moreover, the panel of an Al base material is press-fitted with the nut in a warm state or a hot state, and therefore cracking or the like is less likely to occur. In other words, according to the present invention, the member for fastening in which the panel of an Al base material and the nut are joined to each other can be efficiently manufactured with a high yield.

«Member for Fastening and Fastening Structure»

The present invention is also perceived as a member for fastening. For example, the present invention may provide a member for fastening in which a nut is joined to a panel of an aluminum base material. The panel has a mounting hole for the nut. The nut comprises: a main body having an internal thread and a bearing surface that is wider than the mounting hole; and a tubular joint portion extending from the bearing surface side to one side in an axial direction of the internal thread. The joint portion is fitted in the mounting hole. The joint portion has a rotation-preventing portion and a retaining portion. The rotation-preventing portion has a concave and convex shaped outer peripheral surface biting into an inner surface of the mounting hole. The retaining portion merges into the rotation-preventing portion and has a widened width on one surface side of the panel.

Further, the present invention is also perceived as a structure in which another member is fastened to the member for fastening so that an external thread (such as that of a bolt) is screwed with the nut of the member for fastening. The size (master-slave) relationship between the member for fastening and the other member is not limited. The external thread to be screwed with the internal thread of the nut may be integrated with the other member to be fastened or may also be that of a bolt or the like independent of the other member.

«Others»

(1) The "axial direction" as referred to in the present specification is an extending direction of the central axis (helical axis) of the internal thread formed in the nut. For descriptive purposes, the panel side will be referred to as one side, one end side, one surface side, etc. while the nut side will be referred to as the other side, the other end side, the other surface side, etc. with respect to the axial direction. The depth (direction), thickness, height, etc. are defined along the axial direction, and the width (direction), diameter, etc. are defined along the orthogonal direction to the axial direction.

(2) Unless otherwise stated, a numerical range "x to y" as referred to in the present specification includes the lower limit x and the upper limit y. Any numerical value included in various numerical values or numerical ranges described in the present specification may be selected or extracted as a new lower or upper limit, and any numerical range such as "a to b" can thereby be newly provided using such a new lower or upper limit. Unless otherwise stated, a range "x to y kN" as referred to in the present specification means x kN to y kN. The same applies to other unit systems (such as kA).

EMBODIMENTS FOR CARRYING OUT THE INVENTION

Figure 1A:
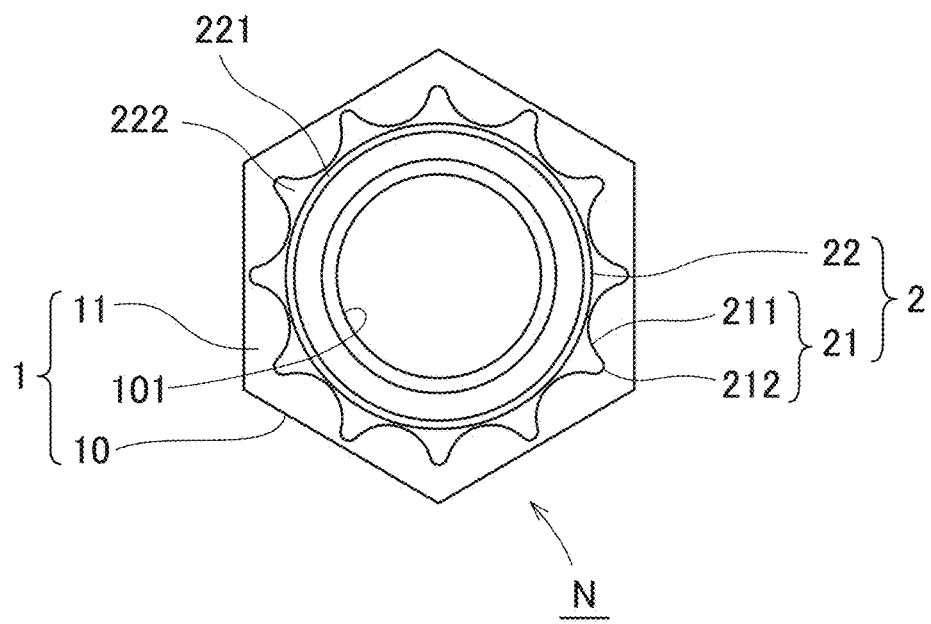
FIG. 1A is a plan view of a nut as an example.

One or more features freely selected from the present specification can be added to the above-described features of the present invention. The content described in the present specification can be applied not only to the manufacturing method but also to products (such as a member for fastening and a fastening structure), etc. as appropriate. Which embodiment is the best or not is different in accordance with objectives, required performance, and other factors.

«Panel»

(1) Al Base Material

The Al base material may be a wrought material or a cast material (mainly a die-cast material). The Al base material may be pure Al, an Al alloy, or a composite material (the parent material is pure Al, an Al alloy, or the like). The panel suffices to include at least one sheet material of an Al base material (simply referred to as an "Al base sheet"). That is, the panel may be a laminate of a plurality of Al base sheets or otherwise a laminate of one or more Al base sheets and one or more dissimilar sheet materials (e.g., one or more steel sheets). Joint (e.g., spot welding, etc.) between the sheet materials constituting the laminate may be present or absent.

The Al base sheet is, for example, an Al alloy sheet of 2000 series to 8000 series, in particular 5000 series (such as A5052, A5083, or A5005) or 6000 series (such as A6022, A6016, or A6N01).

The thickness (t) of the panel (in particular, an Al base sheet) is, for example, 0.6 to 3 mm in an embodiment or 0.8 to 2 mm in another embodiment. When the thickness (t) is expressed using a pitch (p) of the internal thread, the manufacturing method of the present invention is particularly effective in a case of t≤(<)3p in an embodiment, t≤(<)2p in another embodiment, or t≤(<)p in still another embodiment.

(2) Mounting Hole

The mounting hole provided in the panel preferably has a form (shape, size) suitable for the joint portion of the nut to be inserted. The mounting hole is not limited to a circular (cylindrical) shape and may also be a polygonal shape (such as a rectangular shape). The size (width) of a circular mounting hole is indicated by the inner diameter. The center line (axis line) of the mounting hole may not necessarily have to be perpendicular (orthogonal) to the panel. The depth of the mounting hole is usually about the same as the thickness (t) of the panel. When the depth of the mounting hole and the thickness (t) of the panel are different, the depth of the mounting hole is used as a dimensional criterion (t).

«Nut»

The nut is in a tubular shape into which a bolt or the like is screwed (penetrated), and has a main body with an internal thread and a joint portion to be attached to the panel. Specific description is as follows.

(1) Main Body

The internal thread may be formed over the entire length of the main body or a portion thereof. The internal thread may be preferably 2 or more pitches in an embodiment, 3 or more pitches in another embodiment, or 4 or more pitches in still another embodiment. Suffice it to say that the size of the internal thread is M2 to M12 (JIS) in an embodiment, M3 to M10 in another embodiment, or M4 to M8 in still another embodiment.

The outer shape of the main body may be a cylindrical tubular shape or a polygonal tubular shape (e.g., hexagonal nut-shape). The cross section may not be uniform in the axial direction. One end surface side of the main body is preferably formed with a (main) bearing surface that is wider than the inner width (such as inner diameter) of the mounting hole.

(2) Joint Portion

The joint portion extends from the bearing surface side of the main body to the one side in the axial direction and is longer than a depth (t) of the mounting hole. The joint portion has a rotation-preventing portion and a guide portion. The rotation-preventing portion bites into the mounting hole of the panel to prevent the circumferential movement (rotation). The guide portion extends from the rotation-preventing portion further to the one side and is inserted into the mounting hole. The inner surface of the guide portion may be tapered such that the inner width (e.g., the inner diameter) increases from the bearing surface side.

The rotation-preventing portion has a concave and convex shaped outer peripheral surface. The form (shape, size), number, etc. of the concave portions and convex portions are adjusted as appropriate. For example, the concave portions and the convex portions may be straight (constant cross section in the axial direction) or tapered (forward taper that narrows (becomes thin) to the one side, reverse taper that widens (becomes thick) to the one side, etc.). Additionally or alternatively, the concave portions and the convex portions may change in the shape along the axial direction. Additionally or alternatively, the trough lines of the concave portions and the ridge lines of the convex portions may be straight lines or curved lines intersecting with the axial direction.

The outer peripheral surface of the rotation-preventing portion has a maximum width (Do; e.g., the diameter of a circle circumscribing the convex portions), and the maximum width (Do) is preferably larger than an inner width (d; e.g., the inner diameter) of the mounting hole. This allows the rotation-preventing portion to bite into the mounting hole during the pressurization step to prevent the co-rotation. The outer peripheral surface of the rotation-preventing portion has a minimum width (Di; e.g., the diameter of a circle inscribed in the concave portions (bottoms)), and the minimum width (Di) may be larger or smaller than the inner width (e.g., the inner diameter) of the mounting hole.

The rotation-preventing portion has a length (h) in the axial direction, and the length (h) is preferably less than a depth (t; the thickness of panel) of the mounting hole. Suffice it to say that the length (h) may satisfy $t/5 \leq (<) h \leq (<) 2t/3$ in an embodiment or $t/4 \leq (<) h \leq (<) t/2$ in another embodiment. A longer rotation-preventing portion improves the co-rotation resistance. A shorter rotation-preventing portion can avoid redundancy of the retaining portion formed after the pressurization step.

The guide portion extends from the rotation-preventing portion to the one side and has a width smaller than the maximum width of the outer peripheral surface of the guide portion. More specifically, the thickness of at least one end portion of the guide portion is preferably not more than the minimum thickness of the rotation-preventing portion. This allows the guide portion to be plastically deformed (swaged) more easily than the rotation-preventing portion, and the retaining portion can be easily formed. Preferably, the maximum width (e.g., the outer diameter) of the guide portion may be slightly smaller than the inner width (e.g., the inner diameter) of the mounting hole. This allows the guide portion to be easily inserted into the mounting hole, and the workability in the energization step and the pressurization step is improved accordingly.

The length of the guide portion in the axial direction is preferably not less than the depth (t) of the mounting hole. This allows a pair of electrodes to easily energize and resistively heat the nut directly while clamping one end surface of the guide portion and the other end surface of the main body. Moreover, it is easy to plastically deform one end portion of the guide portion into the retaining portion while suppressing the deformation (such as depression) of the panel on the one surface side due to the electrode. When the retaining portion is in a state of being in close contact with the one surface side of the panel, the nut can be fixed to the panel without loosening or the like.

The guide portion to become the retaining portion has a length (g), and the length (g) may be, for example, about 0.1 to 1 mm in an embodiment or about 0.2 to 0.5 mm in another embodiment.

(3) Material

The nut is preferably made of a material that can be resistively heated, but particularly preferably made of a metal having an electrical resistivity higher than that of the Al base material. This allows the nut to preferentially generate heat as compared with the panel while suppressing the current value. Examples of such materials include an iron base material and a titanium base material.

«Electrodes»

The electrodes preferably have a form (shape, size), material, etc. suitable for energizing and pressurizing the nut. The electrodes may be dedicated ones or general-purpose ones. Typical examples of general-purpose electrodes include those for spot welding (simply referred to as "electrodes"). A case of using the electrodes will be described as an example.

(1) Form

The electrodes may each be an electrode that can be detachably attached to a shank (a cap tip-type electrode) or may otherwise be an electrode that is integrated with a shank (an integrated-type electrode). The cap tip-type electrode (also referred to as a "tip") is usually used in order to reduce the cost.

The electrode (tip) has, for example, a tip portion that is formed in a bottomed and approximately cylindrical shape and a body portion that is formed in an approximately cylindrical shape and merges into the tip portion. The size of the electrode is not limited. The body portion has an outer diameter (nominal diameter; L2), and the outer diameter (L2) is, for example, $\varphi 10$ to 20 mm in an embodiment or $\varphi 12$ to 18 mm in another embodiment. The tip portion has a tip diameter (L1), and the tip diameter (L1) is, for example, $\varphi 6$ to 14 mm in an embodiment or $\varphi 8$ to 12 mm in another embodiment.

The tip portion of the electrode preferably has a shape suitable for an end surface of the nut to be pressurized. For example, when the electrode is brought into pressure contact with a flat surface of the main body (the other end surface of the nut), the tip portion preferably has a flat surface or a gently curved surface. When the electrode is brought into pressure contact with an annular surface of the joint portion (the one end surface of the nut), the tip portion preferably has a curved surface, a spherical surface, or the like. This allows the electrode to be stably brought into contact (pressure contact) with the nut. When the tip portion of such an electrode is provided with a curved surface having a radius of curvature of 10 to 100 mm in an embodiment or 40 to 80 mm in another embodiment, the tip of the guide portion can be deformed without buckling.

Various basic shapes of the tip portions of electrodes (in particular, convex electrodes) are defined, for example, in JIS C9304 (1999). Specific examples of the basic shapes include a flat shape (F-type), a radius shape (R-type), a dome shape (D-type), a dome radius shape (DR-type), a cone frustum shape (CF-type), and a cone frustum radius shape (CR-type). Each electrode of the pair may have the same form or a different form. For example, an R-type electrode may be used on the one end side of the nut while an F-type electrode may be used on the other end side of the nut. The electrodes may be forcibly cooled by introducing a coolant (cooling liquid/cooling water) inside.

(2) Material

The electrodes (at least the tip portions) are preferably made of a material excellent in the electrical characteristics (such as electrical conductivity) and the mechanical characteristics (such as strength and rigidity). For example, the electrodes are made of a copper alloy having an electrical conductivity of 75% to 95% IACS in an embodiment or 80% to 90% IACS in another embodiment. The copper alloy is, for example, chromium copper, zirconium copper, chromium-zirconium copper, alumina-dispersed copper, beryllium copper, or the like. The material of each electrode of the pair may be the same or different.

«Energization Step»

In the energization step, after the guide portion is inserted into the mounting hole from the other surface side, the pair of electrodes in contact with both end surfaces of the nut is used to energize the nut to generate resistance heat. This allows the periphery of the mounting hole of the panel to be softened by its own resistance heat generation and heat transfer from the nut. The Al base material that constitutes the panel usually has a low electrical resistivity, and it is therefore considered that the main heating around the mounting hole is due to the heat transfer from the nut. The energization step may be performed prior to the pressurization step for press-fitting and swaging the nut or may also be performed in a superimposed manner (in parallel) with the pressurization step. In the latter case, the energization step and the pressurization step may be started at the same time, or the energization step may be followed by the pressurization step (increase of the pressing force).

When DC energization is performed, the current value is, for example, 2 to 7 kA in an embodiment or 3 to 6 kA in another embodiment. The current density is, for example, 10 to 150 A/mm$^2$ in an embodiment or 20 to 100 A/mm$^2$ in another embodiment. When the current value varies, the integrated average value of the current value (absolute value) with respect to the energization time is defined as the "current value." The current density is obtained by dividing the current value by the contact area between an electrode and the nut. The contact area is the smaller one of that on the one end surface side and that on the other end surface side.

The energization step is preferably performed by bringing the electrodes into pressure contact with both end surfaces (sides) of the nut. This reduces the contact resistance and enables stable energization. When the energization step is performed prior to the pressurization step, the pressing force during the energization step may be smaller than that during the pressurization step. The pressing force may be, for example, 2 to 7 kN in an embodiment or 3 to 6 kN in another embodiment. When the energization step is performed prior to the pressurization step, the energization time is, for example, 25 to 500 ms in an embodiment or 50 to 300 ms in another embodiment. When the energization step and the pressurization step are performed in parallel, the pressurizing force in both steps may be the same.

The energization step may be performed while varying the current value (current density), the pressing force, etc. in multiple stages or continuously. Prior to the main energization, pre-energization or pre-pressurization may be performed to settle the contact state between the electrodes and the nut.

«Pressurization Step»

The pressurization step is performed by pressurizing (pressing) with the electrodes the both end surface sides of the nut whose guide portion is inserted in the mounting hole. This allows one end portion of the guide portion to be swaged to form a retaining portion having a widened width on the one surface side of the panel, thus preventing the nut from dropping off from the panel. Moreover, the rotation-preventing portion bites into the mounting hole of the panel to prevent the nut from rotating (co-rotating) with respect to the panel.

The pressing force applied to the nut in the pressurization step depends on the size of the nut, but is, for example, 2 to 7 kN in an embodiment or 4 to 6 kN in another embodiment. Also in the pressurization step, the pressing force or the like may be varied in multiple stages or continuously. When the energization step and the pressurization step are performed in a superimposed manner, the amount of energization and the pressing force may be coordinately controlled. The pressurization step is preferably concluded at the time (or after) when the rotation-preventing portion is housed (bites) into the mounting hole of the panel and the retaining portion is formed.

«Member for Fastening»

The application, form (shape, size), specs, etc. of the member for fastening, in which the nut and the panel are joined, are not limited. Specific examples of the member for fastening include vehicle bodies, underbody components such as suspensions, panel members, and case members.

An adhesive, a sealant, or other similar agent may be interposed between the nut and the panel or provided around the joint portion depending on the application, specs, etc. of the member for fastening. Additionally or alternatively, the nut may be subjected to antirust treatment such as chromate treatment or zinc plating. The nut may be partially welded to the panel via a coating (such as an antirust coating). Additionally or alternatively, the member for fastening may be subjected to heat treatment for the purpose of removal or the like of the strain and residual stress after the nut and the panel are joined.

Examples

Samples were each manufactured by joining a nut of steel to a panel (Al base sheet) of an Al base material, and the characteristics were evaluated. The present invention will be described in more detail while presenting such specific examples.

«Nut»

Figure 1B:
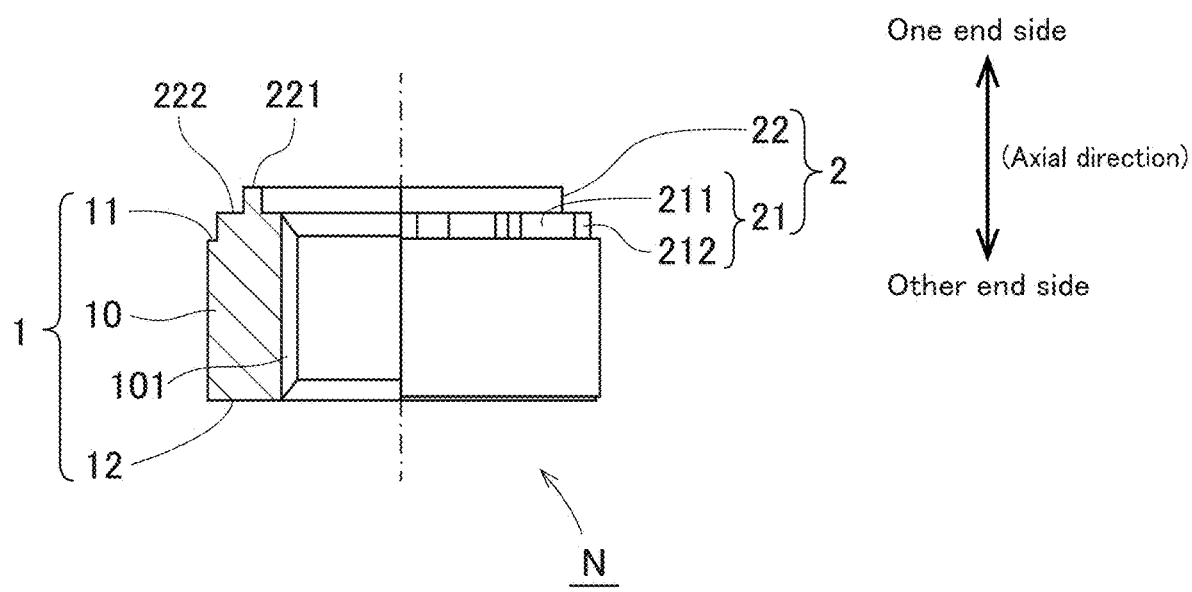
FIG. 1B is a front view illustrating a half section of the nut.

FIG. 1A is a plan view of a nut N according to an example, and FIG. 1B is a front view illustrating a half section of the nut N. Both figures are collectively referred to as "FIG. 1." In the present example, as illustrated in FIG. 1B, an "axial direction" is defined along the center line of the nut N (internal thread 101), one side of which is referred to as "one end (surface) side" and the other side is referred to as the "other end (surface) side." A "width" or "diameter" refers to the length along the direction (transverse direction) orthogonal to the axial direction.

The nut N comprises a main body 1 of an approximately hexagonal nut and a joint portion 2 located on the one end side of the main body 1. The main body 1 includes a tubular base body 10 having a hexagonal outer periphery and an internal thread 101 formed in the inner surface of the base body 10. The base body 10 has a flat annular bearing surface 11 on the one end side and a flat annular end surface 12 on the other end side.

The joint portion 2 has a rotation-preventing portion 21 extending vertically from the bearing surface 11 to the one end side and a guide portion 22 extending vertically from the rotation-preventing portion 21 to the one end side. The rotation-preventing portion 21 has a cylindrical inner surface and a starburst-shaped outer peripheral surface in which 12 concave portions 211 and 12 convex portions 212 are repeatedly arranged. The tips of the convex portions 212 are located inside the outermost periphery of the base body 10 (the bearing surface 11). The wavelike curved surface forming the outer peripheral surface of the joint portion 2 may be a cycloid curved surface, an involute curved surface, or the like.

The guide portion 22 has a cylindrical shape with an inner surface and an outer peripheral surface parallel to each other along the axial direction. The outer peripheral surface is located inside the bottom portions of the concave portions 211 of the rotation-preventing portion 21. The guiding portion 22 has a width smaller than the rotation-preventing portion 21, and the one end surface of the rotation-preventing portion 21 serves as a bearing surface 222.

«Joint»

Figure 2:
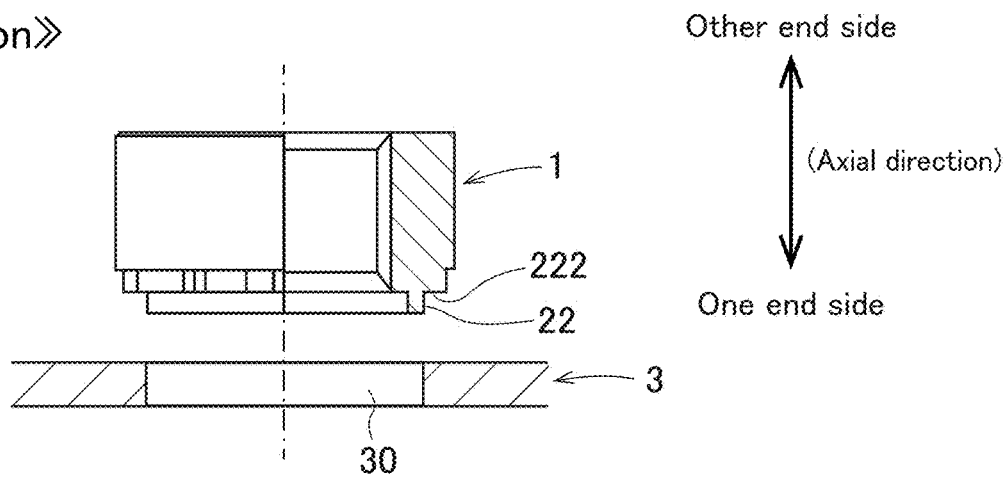
FIG. 2 is a set of process charts explaining a process of manufacturing a member for fastening in which the nut is joined to a panel.
Figure 2:
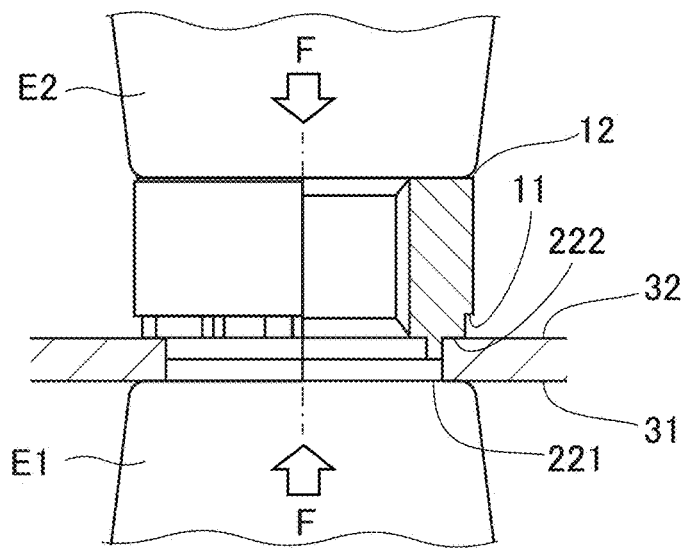
Figure 2:
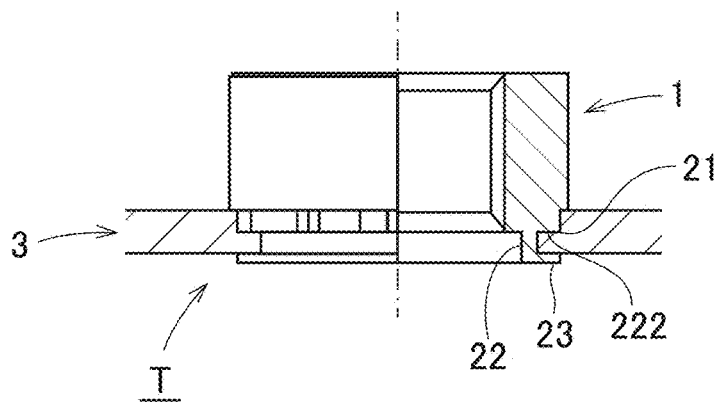

FIG. 2 illustrates how the nut N is joined to a mounting hole 30 of the panel 3. Specific description is as follows.

First, the guide portion 22 of the nut N is inserted into the mounting hole 30 of the panel 3 from the other end side. The nut N stops when the bearing surface 222 comes into contact with the other end surface 32 of the panel 3.

Then, electrodes E1 and E2 set in a spot welder are brought into pressure contact with the one end surface 221 and the other end surface 12 of the nut N to energize it (energization step). After the energization, pressure F applied to the nut N from the electrodes E1 and E2 is increased. The rotation-preventing portion 21 of the nut N is pressed into the periphery of the mounting hole 30, which is thus softened, until the bearing surface 11 abuts the other end surface 32 of the panel 3. In addition, one end portion of the guide portion 22 is swaged and bent so as to open (the diameter increases). Thus, a member for fastening T has been obtained in which the rotation-preventing portion 21 bites into a part of the mounting hole 30 on the other end side and a retaining portion 23 is in close contact with one end surface 31 of the panel 3.

«Bending Test»

Figure 3:
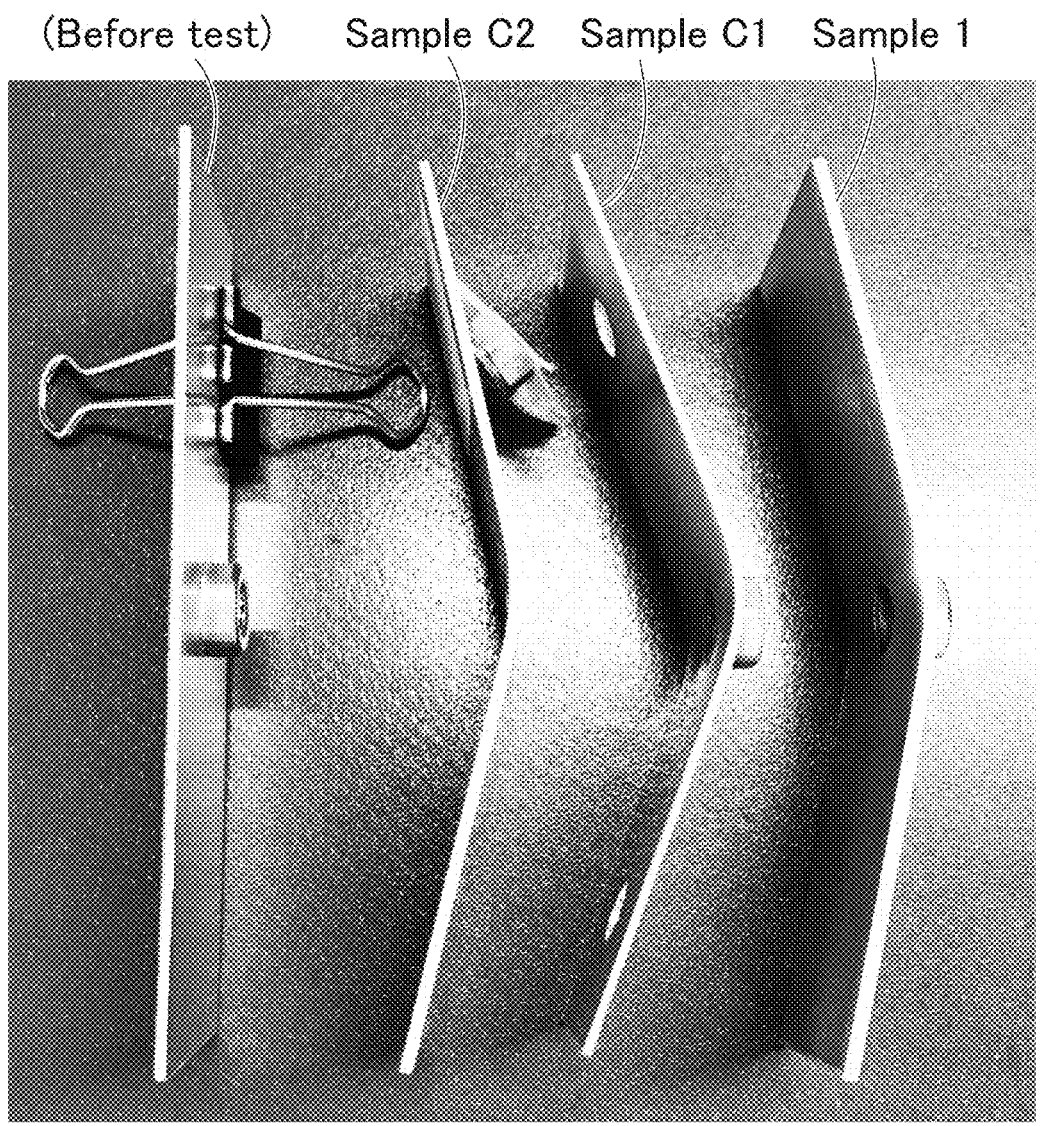
FIG. 3 is a photograph showing the bending test results of test pieces in which various nuts are joined to Al base sheets.
Figure 3:
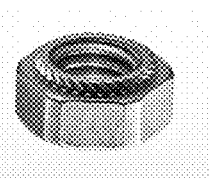
Figure 3:
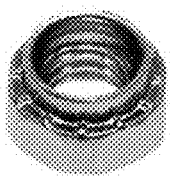

Some samples were manufactured in which nuts were joined to Al base sheets. Approximately the center of each sample was bent by hand to confirm the joint force between the nut and the Al base sheet. The results are collectively shown in FIG. 3. The details of each manufactured sample are as follows. FIG. 3 also shows the state before the test.

(1) Sample 1

The nut N illustrated in FIG. 1 was joined to the panel 3 along the steps illustrated in FIG. 2. The specs and manufacturing conditions are as follows.

The base body 10 was set with the width between opposing two faces being 10 mm, the height (thickness) being 4 mm, the internal thread 101 being M 6 mm×P 1.0 mm (JIS), the height of the rotation-preventing portion 21 being 0.8 mm, and the guide portion 22 being outer diameter 8 mm×inner diameter 7 mm×height 0.8 mm. The material of the nut N was S45C.

The panel 3 was made of an Al alloy (A6022) and width 30 mm×length 100 mm×thickness 1.6 mm. The mounting hole 30 was a drilled hole of φ8 mm.

Energization and pressurization were performed as follows. The electrodes E1 and E2 were brought into pressure contact with respective end surfaces of the nut N by initial pressurization (pressing force: 4 kN, squeeze time: 200 ms). After that, two stages of energization were performed while applying pressure. That is, subsequent to the first energization (current value: 5 kA, energization time: 500 ms, pressing force: 4 kN) (immediately after the first energization), the second energization (current value: 7 kA, energization time: 150 ms, pressing force: 4 kN) was performed. The tip portion of the electrode E1 was in a curved shape (tip diameter: φ12 mm, tip curvature radius: 40 mm). The tip portion of the electrode E2 was made convex (tip diameter: φ6 mm, length: 2 mm) to be inserted into the internal thread 101.

(2) Sample C1

A panel as in Sample 1 (but the thickness was 1.2 mm) was prepared, and a commercially available curling nut (M6-12 (so-called) available from NISHI SEIKO Co., Ltd.) was assembled to the mounting hole. The assembly (joint) of the two was performed using a servo pressurization-type spot welder (available from ART-HIKARI Co., Ltd.).

(3) Sample C2

A commercially available Kalei nut (Kalei nut 6-09 (so-called) available from NIPPON POP RIVETS AND FASTENERS LTD.) was assembled to the mounting hole of the same panel as in Sample C1. The assembly (joint) of the two was also performed using the above-described servo pressurization-type spot welder.

«Evaluation»

As found from FIG. 3, in Sample 1, the nut N did not drop off from the panel 3 even after the bending test. Moreover, even when a rotational torque (about 20 Nm) was applied to the nut N, the nut N did not rotate with respect to the panel 3. Furthermore, no cracks or the like were observed around the mounting hole 30 of the panel 3.

In Sample C1, the nut N did not drop off due to the bending test, but did rotate relative to the panel. In Sample C2, the nut dropped off from the panel in the bending test.

It has thus been confirmed from above that, according to the present invention, the nut can be stably and firmly fixed to the panel of an Al base material.

DESCRIPTION OF REFERENCE NUMERALS

T Member for fastening
N Nut
1 Main body
101 Internal thread
2 Joint portion
21 Rotation-preventing portion
22 Guide portion
23 Retaining portion
3 Panel

The invention claimed is:

1. A method of manufacturing a member for fastening obtained by joining a nut to a panel of an aluminum base material, the panel having a mounting hole for the nut, the nut comprising:

a main body having an internal thread and a bearing surface, the bearing surface being wider than the mounting hole; and a tubular joint portion extending from the bearing surface side to one side in an axial direction of the internal thread, the tubular joint portion being longer than a depth of the mounting hole, the tubular joint portion having a rotation-preventing portion and a guide portion, the rotation-preventing portion having a concave and convex shaped outer peripheral surface, the guide portion extending from the rotation-preventing portion to the one side and having a width smaller than an maximum width of the outer peripheral surface of the rotation-preventing portion, the method comprising:

an energization step of energizing the nut from a pair of electrodes to soften a periphery of the mounting hole of the panel by resistance heat generation of the nut, the guide portion of the nut being inserted in the mounting hole from another surface side than one surface side of the panel, the pair of electrodes being in contact with both end surface sides of the nut; and a pressurization step of swaging one end portion of the guide portion by a pressing force applied from the electrodes to the nut to form a retaining portion and allow the rotation-preventing portion to bite into the mounting hole, the retaining portion having a widened width on the one surface side of the panel.

2. The method according to claim 1, wherein the outer peripheral surface of the rotation-preventing portion has a maximum width that is larger than an inner width of the mounting hole, and the rotation-preventing portion has a length in the axial direction that is less than a depth of the mounting hole, and the guide portion has a length in the axial direction before the pressurization step, and the length of the guide portion is not less than the depth of the mounting hole.

3. The method according to claim 1, wherein the guide portion has a thickness of the one end portion, and at least the thickness of the one end portion is not more than a minimum thickness of the rotation-preventing portion.

4. The method according to claim 1, wherein the retaining portion is in contact with the one surface side of the panel.

5. The method according to claim 1, wherein the nut is made of a metal having an electrical resistivity higher than an electrical resistivity of the aluminum base material.

6. A member for fastening comprising a nut joined to a panel of an aluminum base material, the panel having a first surface, a second surface opposite the first surface, and a mounting hole for the nut extending through the first and second surfaces, the nut made of a material having an electrical resistivity higher than an electrical resistivity of the aluminum base material of the panel, the nut comprising:

a main body having an internal thread and a flat bearing surface that is not axially recessed, the bearing surface being wider than the mounting hole and contacting the first surface of the panel; and a tubular joint portion extending from the bearing surface side to one side in an axial direction of the internal thread, the tubular joint portion being fitted in the mounting hole and extending entirely through the mounting hole beyond the second surface of the panel, the tubular joint portion having a rotation-preventing portion, a guide portion, and a retaining portion, the rotation-preventing portion extending from the bearing surface of the main body, the guide portion located distally of the rotation-preventing portion, and the retaining portion located distally of the guide portion and being a distal-most end of the tubular joint portion, the rotation-preventing portion having a concave and convex shaped outer peripheral surface biting into an inner surface of the mounting hole and extending only partially through the mounting hole from a first surface side of the panel to a location within the mounting hole between the first and second surfaces of the panel, the guide portion extending from the location within the mounting hole between the first and second surfaces of the panel to a second surface side of the panel, and the retaining portion extending radially outward from the mounting hole and contacting the second surface of the panel, wherein the guide portion and the retaining portion of the tubular joint portion do not have the concave and convex shaped outer peripheral surface.

7. The member according to claim 6, wherein the outer peripheral surface of the rotation-preventing portion has a starburst-shaped cross section orthogonal to the axial direction, and the starburst-shaped cross section includes concave portions and convex portions that are approximately periodically arranged.

* * * * *